United States Patent Office 2,956,798
Patented Oct. 18, 1960

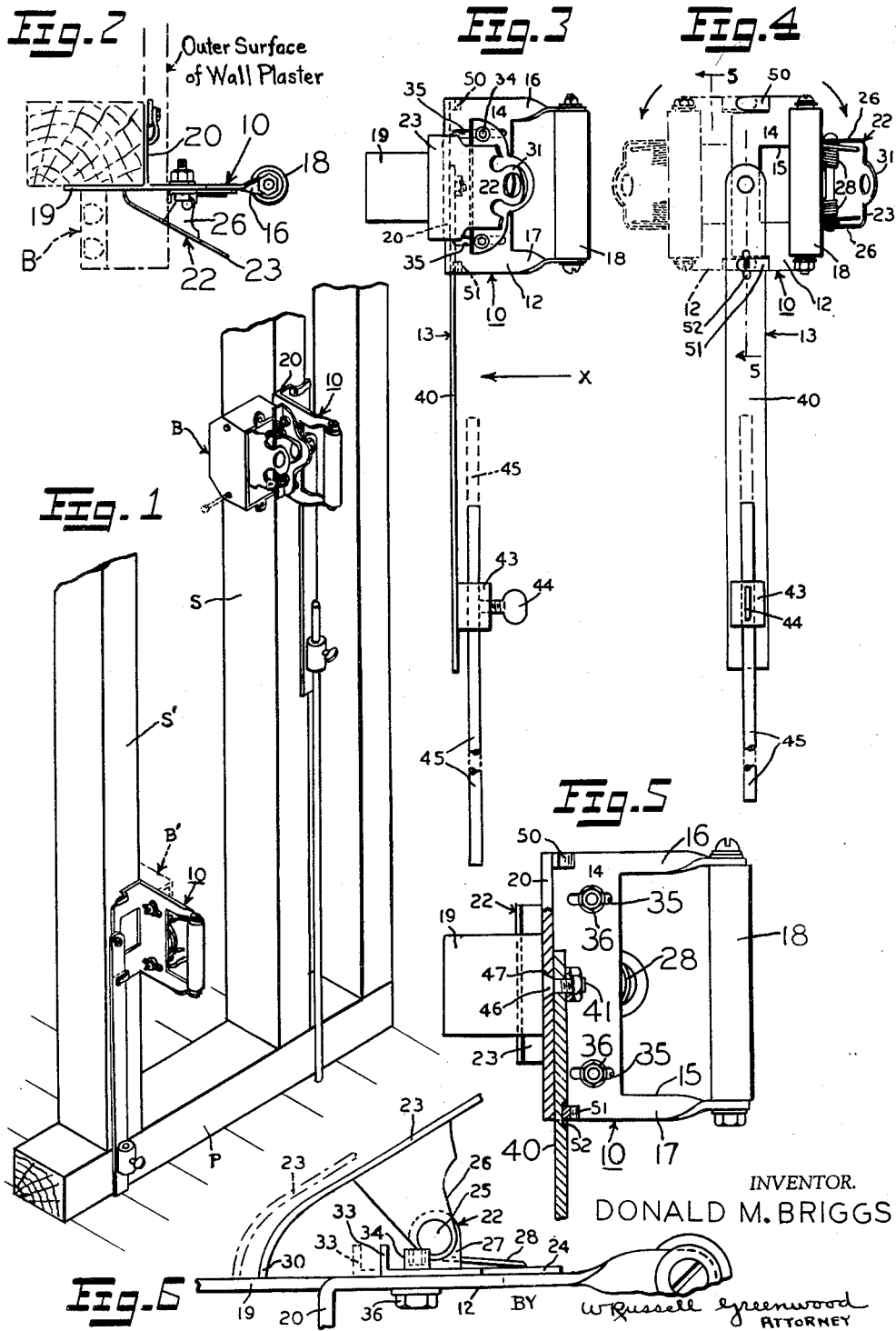

2,956,798

ELECTRICIAN'S HAND TOOL FOR POSITIONING SWITCH BOXES AND THE LIKE

Donald M. Briggs, North Smithfield, R.I., assignor to Uniprod Corp., Franklin, Mass., a corporation of Massachusetts Filed Apr. 27, 1959, Ser. No. 809,298

3 Claims. (Cl. 269—190)

This invention relates to a novel tool or device for positioning electric switch boxes and receptacle boxes, and has for one of its objects to provide a hand-supportable tool or device which will greatly facilitate the installation, by electricians, of electric switch boxes and appliance outlet boxes in the common "lath-and-plaster" walls and partitions of a frame building or house during normal wiring operations while such structures are under construction and prior to lathing and plastering.

Another object of the invention is to provide a portable electrician's box-positioning and supporting tool or device of the class above-mentioned on which a wall box for housing an electric switch or appliance outlet may be temporarily supported and conveniently presented at a required height and in a desired projected relationship for permanent mounting onto an upright wall stud member so that the frontal limits of the box subsequently will lie substantially flush with the outer surface of the plaster of the finished wall or partition.

Another object of the invention is to provide a box-positioner tool or device as above described, which is so arranged that it will be self-gauging for establishing the desired height and depth disposition of the wall boxes preliminary to affixing the same securely in place in framed walls and partitions and thereby eliminate the hitherto customary practice of making measurements and pencil markings on the studding for establishing the individual locations and required mounting positions of such wall boxes.

Another object of the invention is to provide a box-positioner tool or device which will insure the uniform positioning and mounting of electric switch boxes and appliance outlet boxes in framed walls and partitions of new construction.

Another object of the invention is to provide such a box-positioner tool or device with adjustable gauging means for limiting the projected extent of the frontal boundaries of a wall box temporarily mounted on the tool and thereby insure correct positioning of the frontal limits of such box so that when affixed to a vertical wall stud the forward edges of the box walls defining the front opening of such box will lie flush with the outer surface of the usual plaster of the finished wall or partition.

A further object of the invention is to provide a box-positioner tool or device in which the mounting means on which the wall box is temporarily disposed will be supported at the correct height from the floor by a rigid leg structure which has a bar member of predetermined length that can be used alone to uphold the box from the floor at a desired height for uniform placement of an appliance outlet box, and a supplementary rod member by which the effective length of the bar member can be extended and on which the rod can be easily adjusted and set to obtain different predetermined leg lengths for upholding a switch box at a desired height from the floor for insuring the proper placement and mounting of the same in framed walls and partitions.

A still further object of the invention is to provide a handy box-positioner tool or device which is of simple construction, strong and durable, easy to use, and which is well adapted for the purposes described.

Other objects will become apparent from the following detailed description.

This invention will be described in detail by reference to one specific embodiment thereof as shown in the accompanying figures of drawing, in which:

Fig. 1 is a fragmentary pictorial view illustrating the manner in which a hand tool constructed according to the present invention is used to establish the respective positions of an electric switch box and an appliance outlet box preparatory to nailing or otherwise affixing them to the usual upright studding of a framed wall or partition during wiring operations thereof prior to lathing and plastering;

Fig. 2 is a top plan view of the box-positioner tool or device of the present invention, and also depicting the working position assumed by such tool during positioning of a wall box for mounting on a vertical wall stud member so that it will lie flush with the outer plastered surface of the finished wall or partition.

Fig. 3 is a side elevational view of the electrician's box-positioner tool or device shown in Fig. 2;

Fig. 4 is a front elevational view of the box-positioner tool or device shown in Fig. 3, and as viewed from the right end thereof looking in the direction of the arrow "X," and also depicting the pivotal arrangement of the box-supporting head member to permit swinging thereof to either side of its supporting leg for presenting boxes into right or left hand mounting positions;

Fig. 5 is a fragmentary detail view, partly in section and on slightly enlarged scale, of the box-positioner tool or device shown in Fig. 4, taken substantially on the line 5—5 of that figure and looking in the direction of the arrows; and Fig. 6 is an enlarged fragmentary top plan view of the box-positioner tool or device of the present invention.

Referring now to the drawings, and in particular to Fig. 1, the box-positioner tool or device of the present invention is generally indicated by the reference numeral 10, and two applications of the device are shown, one in which it is employed to position an electric switch box B for mounting on a vertical stud S upright from a sole plate P of a framed wall or partition, and the other in which it is employed to position an appliance box B' for mounting on a vertical stud S' upright from said sole plate P. It will be understood, of course, that the stud members S and S' are shown adjacent to each other for the purpose of illustration only and that in normal wiring conditions the wall boxes need not be placed proximate to each other but may be mounted wherever desired in the walls or partitions.

The box-positioning tool or device 10 comprises a swingable box-supporting head member 12 which is pivoted, as will be hereinafter described, to the upper end portion of a floor-engaging supporting leg structure 13 that can be lengthened or shortened at will. The head member 12 is formed of an angular metal plate which has a flat body portion 14 cut out at one side edge as indicated at 15 to provide two spaced arms 16 and 17 between which is bolted a handle element 18. The angular portion of the head member consists of two plate-like flanges 19 and 20 which have plane vertical surfaces disposed at right angles to each other, see Figs. 2, 5 and 6. The flange 19 constitutes a finger-like stub extension of the body portion 14 and together with the flange 20 functions as a vertical rest for the head member 12 of the tool 10 and acts to align it vertically and also seat it perpendicular to the stud member S or S' as the case may be, see Fig. 1.

A spring clamp 22 mounted on the body portion 14 of the head member 12 cooperates with the finger extension or flange 19 to removably hold a wall box B or B' in position on the head member during installation of said box. As illustrated in Figs. 2, 5 and 6, the spring clamp 22 has a movable clamping jaw 23 which is pivotally connected to a base plate 24 by means of a pivot pin 25 extending crosswise of the base plate 24 and mounted in suitable pairs of interfitting ears 26, 26 and 27, 27 integral with the clamping jaw 23 and the base plate 24, respectively. A torsion spring 28 encircles the pivot pin 25 and has suitable pressure-transmitting portions bearing against the jaw 23 and the base plate 24 to impart a desired clamping force to the jaw 23. The clamping jaw 23 has a curved end portion 30 which cooperates with the finger extension or flange 19 and between which parts is clampingly held an abutting side wall of a box B or B', see Fig. 2. The opposite end portion of the clamping jaw 23 is provided with an arcuate finger piece 31 for applying pressure to release said jaw and free the box held thereby.

Means are provided on the base plate 24 to act as a combined gauge and stop for limiting the projected extent of the frontal edges of the box B or B' which may be temporarily clamped to the head member 14 and thereby insure the correct positioning of the frontal limits of such box whereby it will lie flush with the usual plaster, tile, or other surface of the finished wall or partition. To this end, the base plate 24 is formed with an upstanding lip 33, see Fig. 6, for engaging the lower front edge of the wall box B or B' so as to establish the projected position of the box the correct distance beyond the front vertical face of the wall stud S or S' and terminate at the outer plaster line. The clamping jaw 23 together with the stop or base plate 24 can be adjusted in unison in various forward or rearward settings by means of suitable bolts 34, here shown as being socket-headed, which pass through suitable elongated slots 35 in the body portion 14 of the head member 12 and are tightly secured in place by nuts 36.

As previously mentioned, the box-positioner tool or device 10 is provided with an extensible floor-engaging leg structure 13 for effecting height positioning of the head member 12 when mounting the boxes B or B' in a wall or partition. The leg structure 13 may comprise two or more rigid members, one of which consists of a main flat bar 40 which is pivoted at its upper end by a pivot bolt or pin 41 to the flange 20 of the head member 12, and the lower end portion of which is provided with a sleeve-like lug 43 carrying a thumb screw 44, and through which lug is adjustably inserted and secured a rigid rod 45 of appropriate length to meet the normal height standards of wall switch boxes and such receptacle boxes as are placed at well above baseboard heights. Additional rod sections may be similarly added if necessary. As shown in Fig. 5, the pivot bolt or pin 41 has a conically shaped head 46 which is adapted to lie flush with the surrounding surface of the bar member when positioned in the countersunk hole 47 thereof. Thus, the plane rest surface of the flange 20 is devoid of projections and can be seated evenly on the studding S or S'.

In the use of the tool or device 10, the electrician after clamping a switch box B on the head member 12, then adjusts the rod member 45 of the leg structure 13 to a predetermined length required to establish the lower edge of the box B at a desired height above the floor. The electrician then grasps the handle 18 and holds the device 10 upright and vertically supported on the floor by the leg structure 13 so that the flanges 19 and 20 of the head member 12 abut against stud S and the switch box B will be in position for nailing to the side of the stud S at the proper height and projecting relationship thereto. Similarly, the receptacle box B' may be installed on the stud S', but in this case, the second rod 45 is removed and the length of the main bar member 40 as it stands upright from the floor serves as the height gauge for placement of the box B'.

As illustrated in Fig. 4, the entire head member 12 may be swung on the pin or bolt 41 left to right, and vice versa, to permit the tool or device 10 to be used for installing switch or outlet boxes at either left or right side of a wall stud S or S', see Fig. 1. Fingers 50 and 51 integral with the flange 20 alternately engage a suitable depression 52 provided in the bar member 40 to hold the head member 12 in either of its right and left hand positions on the bar member 40 and prevent flopping on the latter.

The supporting structure 13 when once set to the desired height position for placement of a switch box B or a receptacle box B' will remain at such setting during use in the positioning of all switch boxes, and all receptacle boxes will be mounted at a uniform height when installed by the aid of this tool or device.

The free length of the bar member 40 is usually made to meet the average height for low recepacle boxes which commonly are installed a few inches above the baseboard.

It should be understood that the present disclosure is for the purpose of illustration only and that this invention includes all modifications and equivalents which fall within the terms and scope of the appended claims.

What is claimed is:

1. An electrician's box-positioning hand tool comprising a box-supporting head member, handle means associated with said head member and by which the latter may be hand supported while in use, clamp means on said head member adapted to removably mount and hold on the head member in the desired position a switch or receptacle wall box that is about to be affixed to a vertical wall stud of a frame building, and a floor-engaging leg structure comprising a rigid bar member connected at its upper end to said head member and so arranged that the head member may be capable of pivotal movement relative to the leg structure, said bar member being of a predetermined length so that it can be used alone to engage a floor and uphold the head member and a receptacle wall box clamped thereon to position the latter at the desired height from the floor for affixing each wall box to a vertical wall stud member, and a removable supplemental rigid rod member adjustably carried by said bar member and by which the effective length of the bar member can be extended to obtain different desired lengths of said leg structure for placing a switch box in correct position to be affixed to a particular wall stud member.

2. An electrician's box-positioning hand tool comprising a box-supporting head member having a flanged extension, handle means associated with said head member and by which the latter may be hand supported while in use, spring clamp means on said head member coacting with said flanged extension for removably mounting and holding on the head member in the desired position a switch or receptacle wall box that is about to be affixed to a wall stud of a frame building, and a floor-engaging leg structure including a bar member pivotally connected at its upper end to said head member and so arranged that the head member may be capable of pivotal movement relative to the leg structure, said leg structure being adjustable in length to vertically support said head member at a predetermined height from a floor when the head member is hand supported by said handle means alongside a vertical wall stud member, said head member further being swingable manually and bodily on its pivot connection with said bar member to assume either right or left hand positions with respect to said leg structure for presentation and positioning of such wall box for effecting either right or left hand mounting thereof as desired on a particular vertical wall stud member.

3. An electrican's box-positioning hand tool comprising a box-supporting head member having a flanged extension, handle means associated with said head member and by which the latter may be hand supported while in use, spring clamp means on said head member coacting with said flanged extension for removably mounting and holding on the head member in the desired position a switch or receptacle wall box that is about to be affixed to a vertical wall stud of a frame building, a floor-engaging leg structure including a flat rigid bar member pivotally connected at its upper end to said head member and so arranged that the head member may be capable of pivotal movement relative to the leg structure, said leg structure being adjustable in length to vertically support said head member at a predetermined height from a floor when the head member is hand supported by said handle means alongside a vertical wall stud member, said bar member being formed with a depression in one face thereof, said head member further being swingable manually and bodily on its pivot connection with said bar member to assume either right or left hand positions with respect to said leg structure for presentation and positioning of such wall box for effecting either right or left hand mounting thereof as desired on a particular wall stud member, and finger means disposed on said head member so as to be alternately engageable within the said depression in said bar member when the head member has been swung about the latter to assume either of its pivotal positions at either side of the leg structure and to secure said head member against accidental dislodgement from either of the pivoted positions into which it has been swung.

References Cited in the file of this patent

UNITED STATES PATENTS

| | | |
|---|---|---|
| 1,115,202 | Ingles | Oct. 27, 1914 |
| 1,766,072 | Hansen | June 24, 1930 |
| 2,500,032 | Helberg | Mar. 7, 1950 |